May 3, 1938.  S. M. ANDERSON ET AL  2,116,093
AIR CONDITIONING SYSTEM UTILIZING REFRIGERATION
Filed Feb. 24, 1936  2 Sheets-Sheet 1
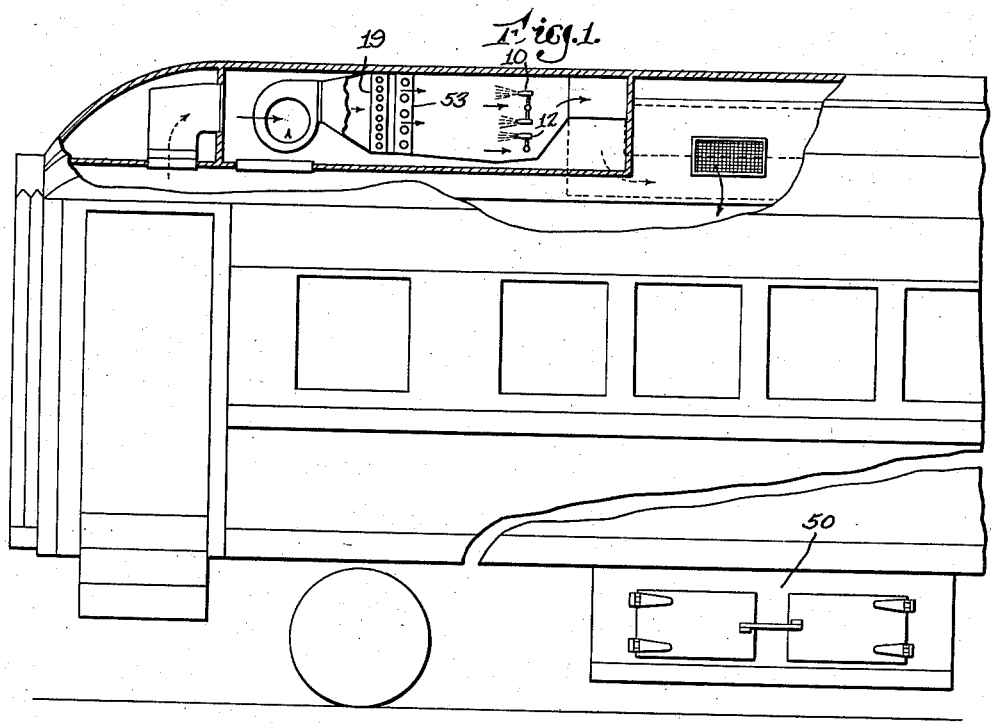
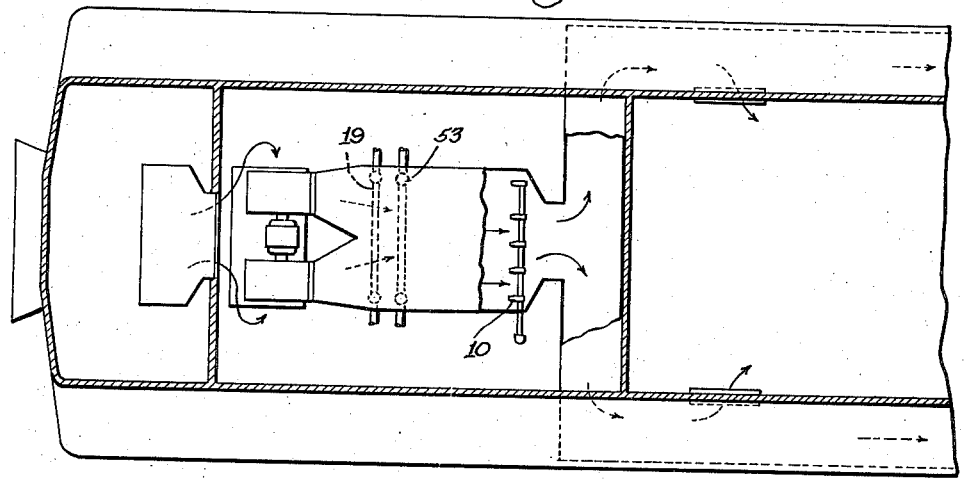
Inventors
SAMUEL M. ANDERSON
FRANK J. HAMILTON
by Robert T. Palmer
Attorney

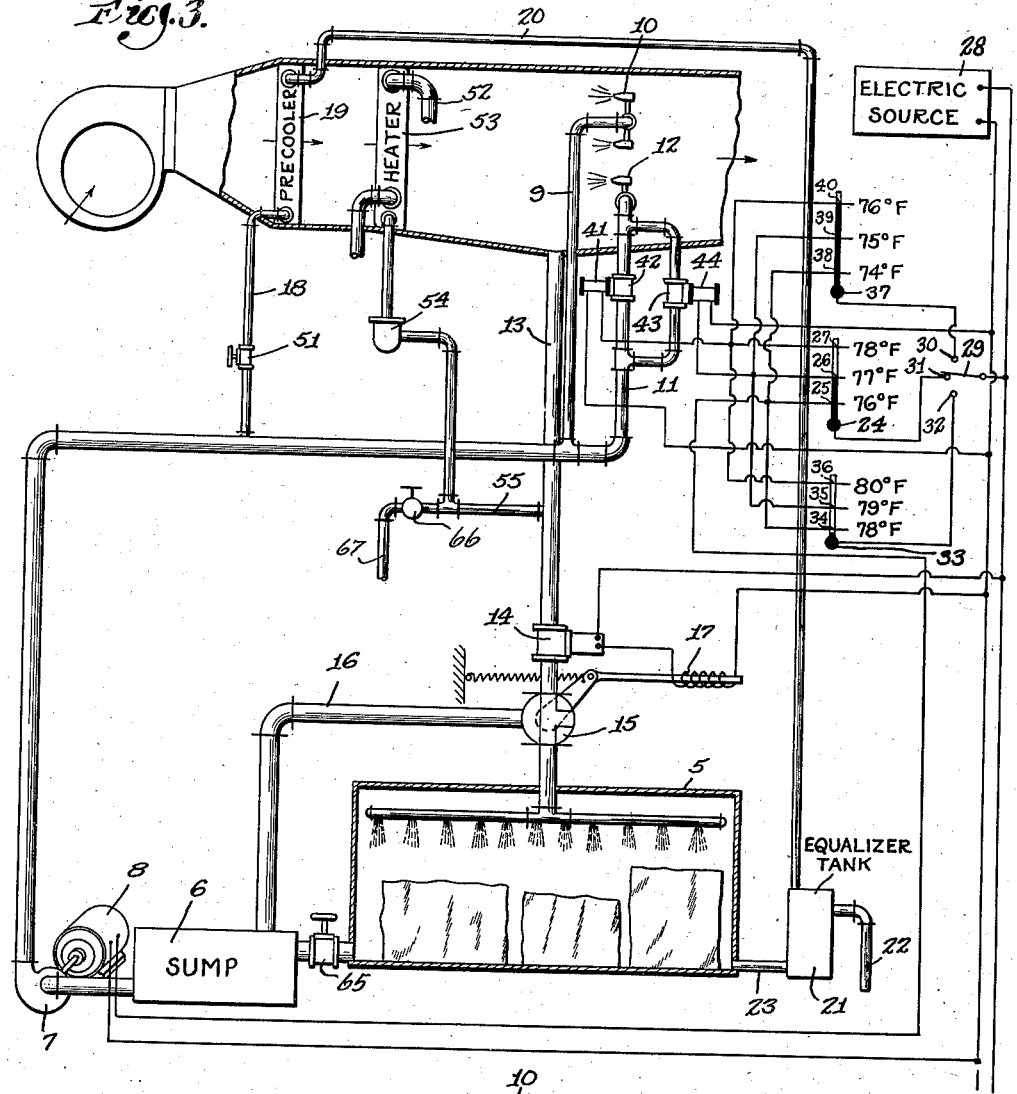
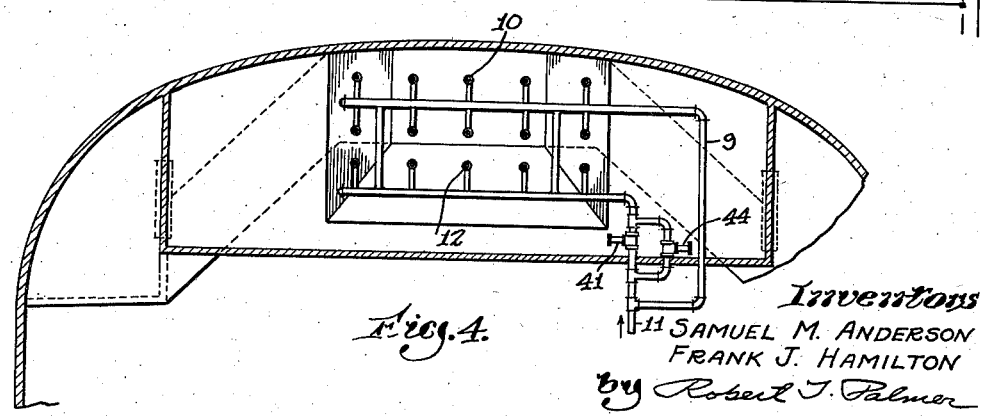

Patented May 3, 1938

2,116,093

UNITED STATES PATENT OFFICE 2,116,093

AIR CONDITIONING SYSTEM UTILIZING REFRIGERATION

Samuel M. Anderson, Sharon, Mass., and Frank J. Hamilton, Chicago, Ill., assignors to B. F. Sturtevant Company, Inc., Boston, Mass.

Application February 24, 1936, Serial No. 65,333

7 Claims. (Cl. 62—131)

This invention relates to methods and apparatus utilizing refrigeration for conditioning the air supplied to passenger vehicles and relates more particularly to a conditioning system for passenger vehicles utilizing spray type conditioners.

Practically all of the railroad passenger car conditioning systems in service today utilize dry coils through which a volatile refrigerant or ice water is circulated, for cooling the air to be supplied within the passenger space. While these coils are effective for cooling and dehumidifying the air, auxiliary filters of the dry type are used for cleaning the air and they do not do this satisfactorily. After a period of time, a thick coating of scum forms over the coils, decreasing their effectiveness and adding odors to the air. Furthermore, the dry filters do not remove the many odors peculiar to railroad cars.

Another disadvantage of the present type system employed on railroad cars, is that the controls do not regulate the temperature satisfactorily. The present type controls usually act to start and stop the supply of refrigeration causing alternate overheating and overcooling.

According to a feature of this invention, a spray type system utilizing two groups of spray nozzles is provided. The system is preferably operated under a dew point control and the volume of liquid projected by the sprays varied under thermostatic control to provide a control of the temperature of the air supplied to the passenger space.

According to another feature of the invention, an automatic control provides a gradual and progressive temperature change. The control operates upon a rise in temperature to gradually increase the cooling effect and upon a fall in temperature to gradually decrease the cooling effect.

According to another feature of the invention, condensate from the steam supplied to a heater in the conditioner in winter, supplies the necessary make-up water for operating the sprays as a humidifier.

An object of the invention is to provide a cooling system for passenger vehicles, which under effective automatic control, washes as well as temperature conditions the air.

Another object of the invention is to provide a temperature control for a passenger vehicle cooling system, which acts progressively and gradually to vary the temperature of the air.

Another object of the invention is to provide in a passenger vehicle conditioning system, a novel form of spray volume control.

Other objects of the invention will be apparent from the following description taken together with the drawings.

The invention will now be described with reference to the drawings of which:

Fig. 1 is a side view with a portion in section of a conditioning system according to this invention, mounted in a railroad passenger car;

Fig. 2 is a plan view, with the car in section, looking down upon the apparatus of Fig. 1;

Fig. 3 is a diagrammatic view illustrating a complete refrigerating and air conditioning system according to this invention, and Fig. 4 is an end view looking at the spray nozzle in the conditioning unit.

Referring first to Fig. 3, ice water from the tank 5 flows into the sump 6 and is circulated by the pump 7, driven by the motor 8, through branch pipe 9 to the spray nozzles 10, and through branch pipe 11 to the spray nozzles 12. The water returned from the spray nozzles flows through the pipe 13 over the immersed thermostat 14, through valve 15 and normally through pipe 16 to be sprayed upon the ice surface in the tank 5.

The by-pass pipe 16 is connected to the valve 15 and serves to shunt or by-pass water around the tank 5 when the water returned from the sprays is cold enough that no further cooling is desired, at which time the thermostat 14 causes the solenoid 17 to actuate the valve 15 to cause the return water to flow through the by-pass pipe 16 instead of to the tank 5. The thermostat 14 thus acts as a dew point control to provide a constant dew point temperature at the conditioner.

A small portion of the water supplied by the pump 7 from the sump 6 passes through the branch pipe 18 to the precooler coils 19 where it serves to precool the air passing to contact later with water from the spray nozzles 10 and 12. The water leaving the precooler passes through the pipe 20 to the equalizer tank 21. The tank 21 is connected also to the discharge pipe 23 from the cooling tank 5, and has the overflow pipe 22 arranged at a level in the tank 21 which corresponds to the desired water level in the tank 5. The precooler coils 19 have such surface that the air passing thereby heats the water leaving these coils to a greater temperature than the water returned from the sprays, through the pipe 13. The amount of water passing through the coils 19 is so chosen as to equal the amount added normally by the melting of the ice in the tank 5. Thus, the water drained to the track through the overflow pipe 22 is the normal excess amount and is at a relatively high temperature. Thus, through the use of the equalizer tank, the heated water from the coils 19 is not fed into the tank 5 to melt unduly the ice therein.

In order to provide a graduated temperature control, three thermostats, each responsive over a different range of temperatures, only one of which is active at a time, are provided, with a manual selector switch for placing the selected thermostat into a control circuit. Each thermostat has been designed to operate through a predetermined range of temperature, a plurality of controls, all of which cooperate, and each of which assists in providing the desired effect. For example, the thermostat 24 is designed to maintain a maximum temperature of 78°, at which temperature and above, the mercury in the thermostat is against the contact 27, closing a circuit through the solenoid 41 and the selector switch 29 and contact 31 to the electric source 28, causing the solenoid to hold its associated valve 42 wide open so as to secure the maximum cooling effect. At the same time, the mercury in the thermostat 24 is also in contact with contacts 25 and 26. Thus, a circuit including solenoid 44, contact 26, contact 31, switch 29, and electric source 28 is closed to energize the solenoid 44, causing it to hold its valve 43 wide open. A circuit is also closed including contact 25 and motor 8 to cause the pump 7 to be active.

When the temperature drops below 78°, the mercury in the thermostat 24 leaves the contact 27 causing the solenoid 41 to become deenergized to close down its valve 42, thus decreasing the cooling effect by increasing the resistance in water-flow to the nozzles 12. If this decrease in the cooling effect is insufficient and the temperature drops below 77°, the mercury in the thermostat leaves its contact 26, causing the solenoid 44 to become deenergized to close down its valve 43, thus shutting down the spray nozzles 12. If this decrease in the cooling effect is not sufficient and the temperature drops below 76°, the mercury in the thermostat 24 leaves the contact 25 causing the pump motor 8 to become deenergized, thus terminating all refrigerated water supply to the conditioner.

Upon increases in temperature, it is obvious that the pump is started when the temperature reaches 76°, the by-pass valve 43 is opened when the temperature reaches 77° and finally the valve 42 is opened when the temperature reaches 78°. The design of the system is such that the cooling effect with all springs in operation is sufficient to prevent the temperature of the car in normal conditions from rising substantially above 78° when the thermostat 24 is placed in control by the selector switch 29.

Since the temperature standard to be maintained in the passenger space will depend not only upon outdoor temperatures but upon the desires of the passengers, the selector switch may be manipulated to place the thermostats 24, 33, or 37 in control to change the temperature standard to be maintained.

If a lower indoor temperature is desired, the selector switch 29 is placed against contact 30. This renders thermostats 24 and 33 inoperative and places thermostat 37 in control. The thermostat 37 is similar to the thermostat 24 except that it maintains a uniform temperature of 76°. Its upper contact 40 is connected in shunt to the upper contact 27 of thermostat 24 and serves to control the solenoid 41. Its middle contact 39 is connected in shunt to the control 26 of the thermostat 24 and serves to control the solenoid 44. Its lower contact 38 is connected in shunt to the lower contact 25 of thermostat 24 and serves to control the pump motor 8.

If on the other hand a higher indoor temperature is desired, the selector switch 29 is placed in contact 32. This places thermostat 33 in control and maintains a maximum temperature of 80°. Its three contacts 34, 35 and 36 are connected in shunt to the three corresponding contacts 25, 26, and 27 of the thermostat 24 and serve to control the pump motor 8, the solenoid 44 and the solenoid 41, respectively.

The ice tank 5, the pump, equalizer tank 21, and associated apparatus is preferably mounted in the compartment 50 on the under side of the car as shown by Fig. 1.

In winter, the valve 15 is adjusted to by-pass all water flow through pipe 16 around the tank 5. The valve 51 in the precooler line and the valve 65 between the tank 5 and sump 6 are also closed. The pump 7 is then operated to supply water for humidifying purposes to the spray nozzles 10 and 12. Steam is supplied through the pipe 52 to the air heating coils 53. Condensate from the heater coils 53 is collected in the trap 54 and is fed through the pipe 55 into the recirculated water pipe 13 to add the necessary make-up water to the system. The valve 66 and pipe 67 serve to return the condensate to the steam supply source when make-up water is not required. In winter, thermostats 33, 37 and 24 are removed from service; the valves 42 and 43 are operated in open position; the motor 8 is preferably controlled by a hygrostat in the passenger space (not shown) and the supply of steam is controlled by a thermostat mounted within the passenger space (not shown).

Whereas one embodiment of the invention has been described for the purpose of illustration, it should be understood that the invention is not limited to the exact arrangement described, since many departures will suggest themselves to those skilled in the art, after having had access to this disclosure.

What is claimed is:

1. Air cooling apparatus for a passenger vehicle comprising a cooling compartment, means for passing air through said compartment and for discharging it into the passenger space, a plurality of groups of spray nozzles in said compartment for spraying water into the air passing therethrough, means for supplying refrigerated water to said nozzles, and means responsive to temperature conditions within the passenger space for decreasing upon a decrease in temperature to a predetermined point, the volume of water sprayed by one of said groups of nozzles and for shutting down upon a further decrease in temperature to a lower predetermined point, the supply of water to said one of said groups of nozzles.

2. Air cooling apparatus for a passenger vehicle comprising a cooling compartment, means for passing air through said compartment and for discharging it into the passenger space, a plurality of groups of spray nozzles in said compartment for spraying water into the air passing therethrough, means for supplying refrigerated water to said nozzles, and means responsive to temperature conditions within the passenger space for decreasing upon a decrease in temperature to a predetermined point, the volume of water sprayed by one of said groups of nozzles, for shutting down upon a further decrease in temperature to a lower predetermined point, the supply of water to said one of said groups of nozzles, and for shutting down upon a further decrease in temperature to a still lower predetermined point, the supply of water to another of said groups of nozzles.

3. Air cooling apparatus for a passenger vehicle comprising a cooling compartment, means for passing air through said compartment and for discharging it into the passenger space, a plurality of groups of spray nozzles in said compartment for spraying water into the air passing therethrough, means for supplying refrigerated water to said nozzles, and means responsive to temperature conditions within the passenger space for decreasing upon a decrease in temperature to a predetermined point, the volume of water sprayed by one of said groups of nozzles, for shutting down upon a further decrease in temperature to a lower predetermined point, the supply of water to said one of said groups of nozzles, and for shutting down upon a further decrease in temperature to a still lower predetermined point, the supply of water to all of said groups of nozzles.

4. Air cooling apparatus for a passenger vehicle comprising a cooling compartment, spray nozzles in said compartment, a cooling coil in said compartment, means for passing air through said compartment and for discharging it into the passenger space, means forming a sump, a source of refrigerated water connected to said sump, an equalizer tank connected to said source, a pump connected to said sump, a pipe connecting said pump and said nozzles, a branch pipe connecting said pipe and said coil, means for returning water from said compartment to said source, means forming a by-pass around said source, to said sump, for returning the water from said compartment to said sump, means for returning water from said coil to said equalizer tank, and means for opening and closing said by-pass.

5. Air cooling apparatus for a passenger vehicle comprising a cooling compartment, spray nozzles in said compartment, a cooling coil in said compartment, means for passing air through said compartment and for discharging it into the passenger space, means forming a sump, an ice bin connected to said sump, an equalizer tank connected to said ice bin, a pump connected to said sump, a pipe connecting said pump and said nozzles, a branch pipe connecting said pipe and said coil, means for returning water from said compartment to said ice bin, means forming a by-pass around said ice bin, to said sump, for returning the water from said compartment to said sump, means for returning water from said coil to said equalizer tank, and means for opening and closing said by-pass.

6. Air cooling apparatus for a passenger vehicle comprising a cooling compartment, means for passing air through said compartment and for discharging it into the passenger space, a plurality of spray nozzles in said compartment for spraying water into the air passing therethrough, means for supplying refrigerated water to said nozzles, said last mentioned means including a pair of valves in parallel with respect to each other and in series with said nozzles, and temperature responsive means responsive to conditions within the passenger space for decreasing upon a decrease in temperature to a predetermind point, the volume of water supplied to said nozzles through one of said valves and for further decreasing upon a further decrease in temperature to a lower predetermined point, the volume of water supplied to said nozzles through the other of said valves.

7. Air cooling apparatus for a passenger vehicle comprising a cooling compartment, means for passing air through said compartment and for discharging it into the passenger space, a plurality of groups of spray nozzles in said compartment for spraying water into the air passing therethrough, means for supplying refrigerated water to said nozzles, said means including a pair of valves in parallel with respect to each other and in series with said nozzles, and temperature responsive means responsive to conditions within the passenger space for decreasing upon a decrease in temperature to a predetermined point, the volume of water sprayed by one of said groups of nozzles by closing one of said valves and for decreasing upon a further decrease in temperature to a lower predetermined point, the number of spray nozzles in operation by closing the other of said valves.

SAMUEL M. ANDERSON.
FRANK J. HAMILTON.